(12) United States Patent
Ollis et al.

(10) Patent No.: US 8,442,970 B2
(45) Date of Patent: May 14, 2013

(54) CREATING AND EDITING USER SEARCH QUERIES

(75) Inventors: Joseph Ollis, Kirkland, WA (US); Derek D Shaw, Bellevue, WA (US); Neelima Chinthamani, Bellevue, WA (US); Don Barnett, Monroe, WA (US); Hung Shek Ngan, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 4 days.

(21) Appl. No.: 13/204,126

(22) Filed: Aug. 5, 2011

(65) Prior Publication Data
US 2013/0036137 A1 Feb. 7, 2013

(51) Int. Cl.
*G06F 17/30* (2006.01)

(52) U.S. Cl.
USPC .......................................... 707/713

(58) Field of Classification Search ................ 707/3, 5, 707/713; 709/223
See application file for complete search history.

(56) References Cited

U.S. PATENT DOCUMENTS

| 7,644,054 | B2 | 1/2010 | Garg et al. |
| 7,890,526 | B1 | 2/2011 | Brewer et al. |
| 2007/0061317 | A1 | 3/2007 | Ramer et al. |
| 2007/0233654 | A1 | 10/2007 | Karlson et al. |
| 2008/0154856 | A1* | 6/2008 | Riise et al. .................. 707/3 |
| 2009/0019002 | A1 | 1/2009 | Boulis |
| 2009/0299991 | A1* | 12/2009 | Zarzar et al. .................. 707/5 |
| 2010/0318551 | A1 | 12/2010 | Lai |
| 2011/0055188 | A1 | 3/2011 | Gras |

OTHER PUBLICATIONS

Arias, et al., "Context-based Personalization for Mobile Web Search", A Very Large Data Bases Conference, Aug. 24-30, 2008, 7 pages.

Karlson, et al., "FaThumb: A Facet-based Interface for Mobile Search", In proceedings of the SIGCHI conference on Human Factors in computing systems, Apr. 22-27, 2006, 10 pages.

Kamvar, et al., "Query Suggestions for Mobile Search: Understanding Usage Patterns", In proceeding of the twenty-sixth annual SIGCHI conference on Human factors in computing systems, Apr. 5-10, 2008, 4 pages.

* cited by examiner

*Primary Examiner* — Etienne Leroux
(74) *Attorney, Agent, or Firm* — Shook Hardy & Bacon L.L.P.

(57) ABSTRACT

Systems and methods are provided for creating and modifying search queries. A query can be constructed by allowing a user to select from categories, facets, and/or facet values for addition to a query. A user can optionally supplement the categories, facets, and/or facet values with additional search terms entered by the user. The constructed query can then be submitted to a search engine to identify documents that match the search query. The systems and methods can allow a user to construct a search query using a reduced number of user input actions while still providing a user with the flexibility to enter any search terms desired by the user.

20 Claims, 11 Drawing Sheets

CREATING AND EDITING USER SEARCH QUERIES

BACKGROUND

An increasing amount of network activity is being performed by users working on mobile devices. This includes browsing or searching for information using a mobile device. Due to size constraints, such mobile devices typically do not include a keypad including the standard keys available for a typewriter or laptop computer. As a result, text entry on a mobile device can be awkward and time consuming.

SUMMARY

In various embodiments, systems and methods are provided for creating and modifying search queries. A query can be constructed by allowing a user to select from categories, facets, and/or facet values for addition to a query. A user can optionally supplement the categories, facets, and/or facet values with additional search terms entered by the user. The constructed query can then be submitted to a search engine to identify documents that match the search query. The systems and methods can allow a user to construct a search query using a reduced number of user input actions while still providing a user with the flexibility to enter any search terms desired by the user.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

In various embodiments, systems and methods are provided for creating and editing queries. While the methods can be used for constructing a search query on any type of device, the methods additional advantages for creating and editing queries on a device with a limited keyboard, such as a mobile device. The systems and methods can enable a query to be constructed with a reduced amount of text entry by a user, while still allowing a user to enter or modify a query by entering characters into a query box if desired.

Entering a query can be facilitated by providing a user with an interface for scoped or faceted search query construction. In an example involving a text based query, as a user is entering a characters into a query box, the characters entered are compared with known categories, facets within a category, and facet values corresponding to a facet. If the text entered is a potential match for a known category, facet, or facet value, the user is provided with an option to use the scoped search query builder. In the scoped or faceted search query builder, a user is provided with options for the next term to enter in the search query. When building the search query, the options provided to the user can be based on the category and on the facets and/or facet values already entered. In some embodiments, the options provided to the user correspond to options that will yield at least one matching document when the search query is submitted to a search engine. In these types of embodiments, the scoped search query builder facilitates entering a search query by reducing or minimizing the number of input actions required by a user to build the query. After a user has finished building a query, the query can be submitted to one or more search engines. The scoped search query builder can also be used in situations where a user provides a query by voice.

In other embodiments, modifying a query is facilitated by using a scoped search query builder. In such embodiments, when the user selects a facet or facet value that is already present in the query, the user is provided with options for modifying the facet or facet value. The user can also delete a selected facet or facet value with a single user input action. Still another option is that the user can enter text to provide a facet or facet value that is not offered as an option from within the scoped search query builder. In these types of embodiments, the search query can be modified with a reduced number of input actions by using pre-defined options from within the scoped search query builder, but the user can also readily add text for query terms or keywords that do not match the pre-defined options. These query modification techniques can also be used in situations where a user provides a query by voice.

Categories, Facets, and Facet Values

In an embodiment, use of a scoped search query builder is enabled by having a pre-defined group of categories. In such an embodiment, the scoped search query builder can be used for building queries corresponding to the pre-defined categories. A category is typically a topic, such as movies, restaurants, or events. Within a category, a number of facets are also defined. The facets typically represent common search options that are appropriate for the category. For example, one type of search category can be "movies". Within the category movies, facets could include movie name, a type of movie (such as comedy, thriller, action), geographic location (such as city or town), a theater the movie is playing at, or a time the movie is showing. For each facet, a variety of facet values will typically be known. The facet values represent potential values for a facet that can be selected by a user in constructing a query. As noted above, the facet "type of movie" can have potential facet values of comedy, thriller, or action. For geographic location, examples of facet values can be a city or town such as Seattle, a neighborhood such as Tribeca in New York City, or any other convenient geographic entity.

Optionally, instead of selecting a facet or facet value from the pre-defined values known by the scoped search builder, the user can enter characters to provide any facet, facet value, or other keyword. In particular, a user can use the scoped search builder to add a facet and then add a facet value that does not correspond to a pre-defined facet value.

Entry Points for Scoped Search

A variety of entry points are available for accessing a scoped search query builder. One option is to provide an icon or other link to allow a user to select the scoped search builder directly. In this type of embodiment, a user does not have to enter any characters prior to using the builder. Instead, the scoped search query builder can be used to construct the all of the query, or at least the initial portions of the query. When a user directly accesses the scoped search query builder, the query can initially include one or more default keywords. For example, a scoped search query builder may be limited to building queries for finding various types of entities, such as movies or restaurants. In such an example, when the scoped search query builder is started, an initial query can be constructed that includes the keyword "find", or other suitable starting keyword(s). The query builder can then be used to expand on the initial term or terms present in the query.

Another possible entry point is to detect text entered by a user in a query box, and provide an entry point for the scoped search if the detected text is potentially a match for a scoped search category, facet, or facet value. For example, a user may enter the text "ita" as the beginning of a search query in the search box. Based on this initial text entry, the entered text can be compared with the initial letters of known categories, facets, and/or facet values. Alternatively, an auto-completion or other type of query suggestion component can be used to determine potential matches between the text entered by the user and a pre-defined category, facet, or facet value. If a match is identified, a link or entry point to the scoped search query builder can be provided to the user. In this example, a potential match for the text "ita" could be the facet value "Italian" in the facet "type of cuisine" in the category "restaurants." Based on the match to the facet value, several links or entry points can optionally be provided to the user. One entry point would start the query builder with an initial constructed query of "find restaurants with Italian cuisine", which corresponds to the facet value matched in the text entered by the user. Another entry point would start the query builder with an initial constructed query of "find restaurants", corresponding to the category. Either of these initial constructed queries can then be expanded by the user using the query builder, or by typing in additional text. The scoped search entry point(s) can be provided in addition to any other options provided to a user, such as conventional query suggestions for completing the entered text string provided by an auto-complete algorithm.

Addition of Facets and Facet Values

When using a scoped search query builder to construct a search query, a user typically has several choices at any given time. A user can add a facet or facet value to the query; modify a facet or facet value in the query; or remove a facet or facet value in the query. Each of these actions can be repeated as desired until the user is satisfied with the query. At any point, the user can also decide to submit the query to a search engine for identification of matching results.

One action within a scoped search is to add a facet to a query. Once a category is determined, an initial part of the query will typically be constructed. For example, a scoped search related to movies will have an initial query portion of "find movie" or another similar group of one or more keywords indicating an interest in the category of movies.

The initial constructed query can then be expanded to incorporate additional terms by adding facets and/or facet values. In addition to displaying the current form of the search query, a variety of options can be presented to the user for expanding the query. For example, a plurality of terms corresponding to facets within the category can be displayed. The facets can be represented by any convenient text, such as text that will assist in building a query that appears to be a natural language query. To add a facet for a geographic location, one facet option presented to the user could be a facet of "in (location)". The parentheses here provide an example of a term that is included to explain the purpose of a facet to the user, but that will not be included if the facet is selected by the user. If this facet is selected by the user, the resulting query would be "find movie in". In some embodiments, the terms shown in the facet description do not need to have any overlap with the terms added to the query. Other facets presented to the user for selection can provide options for a movie name, a theater, or movie type. By providing the facets as options for selection, a user can add to the query by selecting the desired facet. This allows a facet to be added using a minimal number of user input actions, such as by touching the location of the desired facet or by moving a pointer over the facet and clicking a button to select the facet.

One consideration in presenting facets to a user for selection is the amount of display area available on a device. Many portable or mobile devices have displays with limited display area in order to provide a more convenient form factor for a user. As a result, it may not be practical to display all of the available facets to the user. The facets selected for display, as well as the order for displayed the selected facets, can be determined in any convenient manner. If the number of available facets is limited, all facets can be displayed, or all facets not already in the query can be displayed. The order of display can be alphabetical, based on a predetermined order of display, or the ordering can be based on some type of context. In other embodiments, the facets presented to a user as options and/or the order of display can be filtered using one or more types of context information. Optionally, the user can also scroll the screen to select from additional facet values that were not available in an initial view. One type of context information may be context information related to the user device. This type of context information could include a location of the device a time of day when the search is being formed. Another type of context information can be context related to prior searches performed on a user device or by the user. Previous searches formed using the scoped search query builder can be used to indicate user preferences for facets. Previous search queries submitted without the use of the scoped search query builder can also be used to determine facets preferred by a user. Still another type of context can be a globally derived context, such as preference information based on historical search queries submitted by users that have opted in to a data gathering study.

As noted above, adding a facet changes the constructed query, such as by expanding the query "find movies" to "find movies in" from the example above. After expanding a constructed to query to add a facet, one or more options for facet values (such as geographic locations) are then presented to the user. Once again, the facet value options can be displayed in any convenient order, and context can be used to determine the facet values that will be displayed as well as the order of display. The user can select one of the presented facet values to add to the query. Optionally, the user can also scroll the screen to select from additional facet values that were not available in the initial view. In an example, a user selection of a city as a facet value can expand a constructed query from "find movies in" to "find movies in Seattle".

For facet values, another method of filtering the options presented to the user is by verifying that adding the facet value will produce a result when a search query is submitted to a search engine. The options for facet values are typically selected from a pre-defined list of facet values corresponding to a facet. However, the presence of the facet value on the pre-defined list does not guarantee that including the facet value in the search query will result in matching documents. In an embodiment, a series of test search queries can be performed by adding facet values to the previously constructed search query. The test search queries are then submitted to a search engine. Any facet values that do not generate at least a minimum number of results are not presented to the user. Depending on the embodiment, a facet value can be presented if at least one document matches a test search query, or a larger number of documents matching the test search query can be used as the threshold value. It is noted that while this type of filtering will more often be applicable to filtering of facet values, this type of filtering could also be beneficial for facets.

Selecting and Modifying Facets and Facet Values

In addition to adding facets and facet values to a potential search query, the facets and facet values within a search query can be modified using a reduced or minimal number of user input actions. In order to modify an existing facet or facet value in the query, the facet or facet value is selected by the user. Any convenient selection method can be used. One example of a method with a reduced number of keystrokes is to allow the selection of a facet or facet value by using a "backspace" or other single user input action. For example, a user has used the scoped search to enter the query terms "find movie named". The user then realizes that he would rather choose location first and then pick an available movie option, as opposed to looking for a specific movie title. In this example, the user presses a "backspace" key. The facet corresponding to "named" is the last entry into the query, so pressing the backspace key highlights the facet corresponding to "named". This is in contrast to having the backspace key delete the last letter of "named". The backspace key used by the user can be a key present as part of the physical shell of the mobile device, or the backspace key can be a virtual key presented on the screen of the mobile device. Another method for selecting a facet or facet value can include moving a mouse pointer over a facet or facet value and then performing a user input action to select the value. Still another option can be to use a touch gesture on the screen above or near a facet or facet value to select a desired portion of the query. It is noted that these latter methods can allow for selection of a facet or facet value other than the most recently entered and/or farthest right item in the search query.

When a facet or facet value is selected, the selected item can be modified in several ways. One option is for the user to delete the facet or facet value. After selection, the selected item can be removed by a single action, such as pushing a single key or performing a gesture on a touch screen. For example, a mobile device may have a key designated as "delete", "clear", "backspace", or another label indicating that the key is useful for deleting text. Rather than requiring a user to press the key multiple times to remove the selected item, the selected item is recognized as a category, facet, or facet value, so that all characters are removed with a single keystroke. Similarly, if the mobile device has a touch screen that recognizes various types of gestures, a single touch gesture can be used to remove the facet or facet value.

When a facet value is deleted but the facet remains, the user can be prompted again with the list of potential facet values for selection of another facet value. Similarly, if a facet is deleted, the user can be prompted with a list of potential facets to add to the query. Optionally, after deletion of a facet or facet value, the deleted facet or facet value can be handled in various ways when providing a new list of facets or facet values to the user for selection. One alternative is to provide the deleted facet or facet value without regard to the user's recent deletion. In such an option, the method for displaying and ordering potential choices for the user to select would not be affected by a deletion of a facet or facet value. Another alternative is to exclude the recently deleted facet or facet value so that it is not displayed to the user. Still another alternative is to use the recent deletion as a weighting factor in determining the order for display of alternatives. Thus, the deleted facet or facet value would still be available for selection. The position of the deleted facet or facet value, however, could be lower due to the negative context of having been recently deleted, or possibly higher to reflect the fact that the user recently interacted with the facet or facet value.

Another action within the scoped search query builder is to modify a selected category, facet, or facet value. After selection of a facet or facet value, the user is presented with other facets or facet values that may be used to replace the selection. For a query such as "find movies in Seattle", the facet value "Seattle" can be selected. The user is then presented with a list of alternative facet values that can be inserted in place of "Seattle" in the query. This is similar to the situation of adding a new facet or facet value, with the exception that the options displayed to the user for selection may exclude the value that is already present in the query.

Another option can be modify a facet or facet value using additional text entered by the user. As an example, consider a user with a mobile device located in Seattle, Wash. that has already used the scoped search query builder to construct the query "find movies in Seattle". The user then realizes that he would like to wait to see a movie until later in the week, when the user will have a free evening during a business trip. The user selects the facet value "Seattle" in the constructed query. Due to limited screen space, the mobile device can only present a few facet values at a time. Based on prior permission from the user to use the mobile device location for determining user context, the overall user context causes the mobile device to provide facet value options of "Redmond", "Bellevue", "Spokane", and "Portland, Oreg.". The user realizes that based on the options provided, it might take a number of input actions to scroll through the facet values to find a city not located in the pacific northwest portion of the United States. Instead, the user deletes the value "Seattle", and then starts typing in the letters "bo" or "bos". The letters are used by the query builder to match potential facet values starting with the letters typed by the user. Optionally, a conventional auto-suggestion feature may also provide potential values for completing user text. One or both of these methods of matching identifies the pre-defined facet value "Boston" as a potential match. As a result, "Boston" is provided for display on the device as a potential facet value. If the user were heading to Boston, Mass., this facet value could be selected. However, the user is actually going to Boswell, Okla., which is not a facet value within the pre-defined values. To enter the desired city, the user keeps typing to enter the term "boswell". This results in a search query of "find movies in boswell". The user then performs an input action for submitting the search query. In this example, the user was able to use the scoped search query builder to construct a portion of a search query, and then further expand or modify the query using manually entered text. The user did not have to explicitly exit the scoped search query builder and use a separate query entry box. Instead, the user was able to leverage the query builder for the scoped search, even though the ultimate query desired by the user required a facet value that was not available in the pre-defined facet values.

Example of Operation

Figure 1:
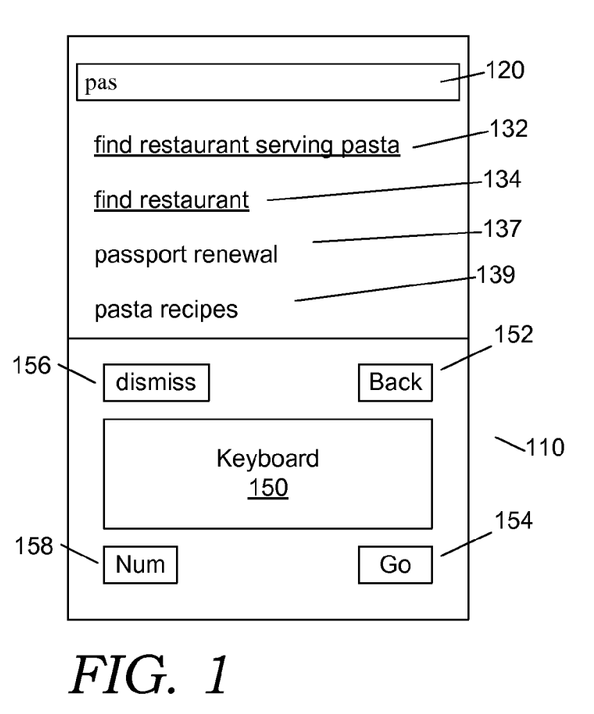
FIGS. 1-12 schematically show examples of the operation of an embodiment of the invention.

FIGS. 1-12 schematically show various examples of a user constructing a query using a scoped search query builder according to some embodiments of the invention. FIG. 1 shows an initial stage for constructing a query on a mobile device 110, although embodiments of the invention could equally be used on a laptop computer, desktop computer, or any other device that is convenient for performing a network search. In FIG. 1, mobile device 110 does not include a physical keyboard. Instead, when a user activates an application for searching, a virtual keyboard 150 is presented to the user. The keyboard 150 can include various keys present on a typical "qwerty" style keyboard, as well as other keys. The keys can be arranged in any convenient manner, such as arranging letter keys alphabetically instead of according to the "qwerty" arrangement. In alternative embodiments, the keyboard 150 may be a reduced keyboard, such as a keyboard where multiple characters can be typed using a single key, or a keyboard where supplemental keys are provided to change the character typed by a key. For mobile device 110, a Num key 158 is provided to convert the keys in keyboard 150 to alternative keys, such as the numbers 0-9, punctuation marks, and other types of symbols. Other examples of special keys that might not be present on a standard keyboard include a Back or Backspace key 152, a Go or Enter key 154, and a Dismiss key 156. The Dismiss key 156 allows the keyboard 150 to be removed from the display to increase available space for other items. Of course, the particular layout of keyboard 150 and additional keys 152, 154, 156, and 158 is exemplary. Additionally, one or more special keys could be integrated as part of keyboard 150.

In the hypothetical example shown in FIG. 1, a user has already launched an application for searching. The user has started to enter a query in search bar or query box 120. Optionally, a mobile device (or other computing device) may be configured to always include a query box 120 as part of the interface. The letters typed so far by the user in query box 120 are "pas". In response, the search engine offers two types of suggestions to the user. One type of suggestion corresponds to conventional search query suggestions 137 and 139. For these types of suggestions, the search engine is using any convenient auto-completion algorithm to suggest possible search queries, such as "passport renewal" 137 and "pasta recipes" 139. The other type of suggestions correspond to suggestions for allowing the user to use a scoped search query builder to construct and/or expand the query. Suggestion 132 is a link that will place the user into a scoped search method for building a query using an initial constructed query of "find restaurant serving pasta". Suggestion 132 is based on comparing the initial characters entered by the user with categories, facets, and/or facet values that have been previously defined for use in the scoped search. In this example, the scoped search understands categories corresponding to restaurants and movies. No match for a facet value was found in the movies category, but the letters "pas" were matched to the facet value "pasta" under the restaurants category. This resulted in presenting suggestion (or entry point) 132 for a scoped search starting with the terms "find restaurant serving pasta". In the embodiment shown in FIG. 1, matching a facet value also results in presenting a user with a entry point starting with only the category, so the suggestion 134 or entry point with the constructed query "find restaurant" was also presented to the user. Optionally, some type of scrolling indicator, such as a scroll bar or arrows, can be provided to the user to indicate that more suggestions are available.

In FIG. 1, it is noted that entry points or suggestions 132 and 134 are shown in underline text, while query suggestions 137 and 139 are shown in plain text. This represents the concept that the interface will provide a user with an indication of the qualitative difference between these types of suggestions. This allows a user to more easily identify that suggestions 132 and 134 are entry points for a scoped search query builder, while suggestions 137 and 139 are simply suggested queries.

Figure 2:
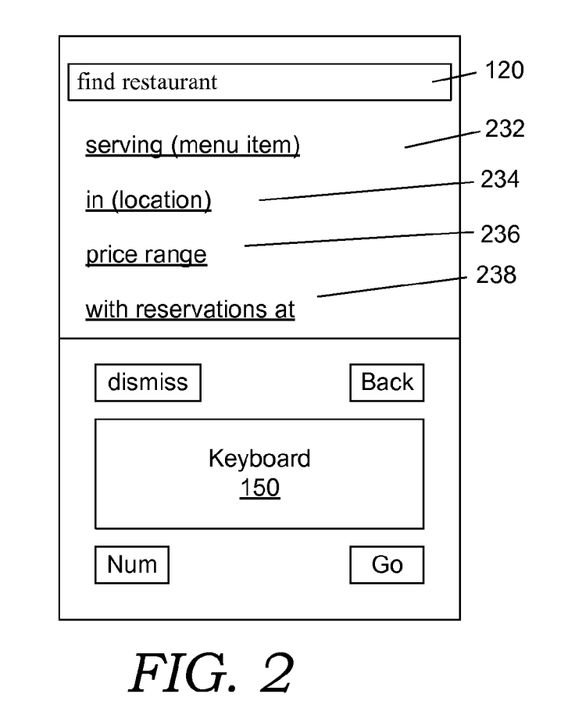
Figure 3:
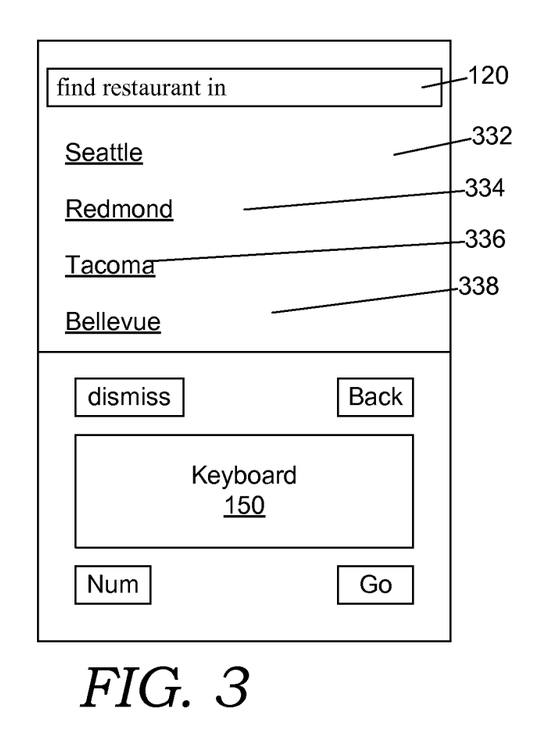
Figure 4:
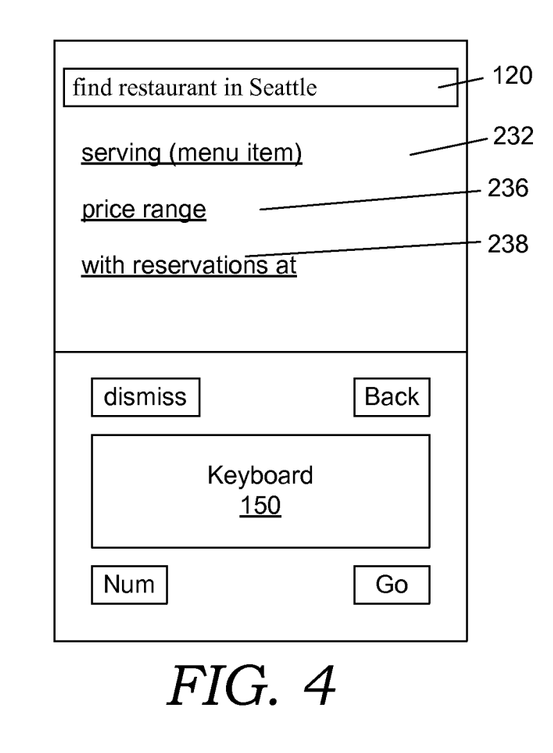

Based on the suggestions, the user selects suggestion 134, the entry point for a scoped search starting with "find restaurant" as the initial constructed query. Entry point or suggestion 134 can be selected by any convenient method. In this example, mobile device 110 is a touch screen device, and the user selects suggestion 134 by using a finger to touch the mobile device in the vicinity of the entry point. This leads to the user interface shown in FIG. 2. At this stage in the query building process, or at any other stage, the user can push a key such as the Go key 154 to execute a search based on the constructed query. In this example, the constructed query corresponds to the text currently in the query bar 120. Alternatively, the user can build on or expand the query by adding or modifying facets and facet values. In FIG. 2, four potential facets 232, 234, 236, and 238 are presented that can be added to the query using the query builder. In this example, facets 232, 234, 236 and 238 indicate the text that will be added to the query if the facet is selected. This text corresponds to the text outside of the parentheses. In order to provide further clarification to a user regarding the nature of a facet, facets such as "serving" 232 and "in" 234 can include additional text that explains the nature of the facet. In FIG. 2, this additional explanatory text that will not be included as part of the search query is indicated in parentheses, but any other convenient designation could be used to differentiate between text that will appear in the query and text that will not.

In this example, the user selects "in (location)" 234 as a facet to add to the constructed query. This results in an interface such as FIG. 3. Because a location facet has been added to the query in query box 120, the user is now presented with facet values 332, 334, 336, and 338. Of course, any convenient number of facet values could be presented to the user, and optionally the user could scroll vertically and/or horizontally to allow for presentation of additional facet values. It is noted that the user can use the Go key 154 to submit the search query at this stage. Because a facet has been added to the query without providing a facet value, the search engine can optionally remove the facet from the constructed query, resulting in a submitted query of "find restaurant" as opposed to "find restaurant in".

In this example, the user selects the facet value 332 corresponding to "Seattle". This results in the interface shown in FIG. 4. In this embodiment, the restaurant category happens to contain four pre-defined facets. Since one facet has already been selected, it is no longer presented to the user. This leaves only three facets for presentation to the user. At this stage of query building, the user has a variety of options. As noted above, the user can use the Go key to submit the search query. Another option is for the user to select another facet to make the query more specific. Still another option is for the user to modify a category, facet, or facet value that is already in the query.

Figure 5:
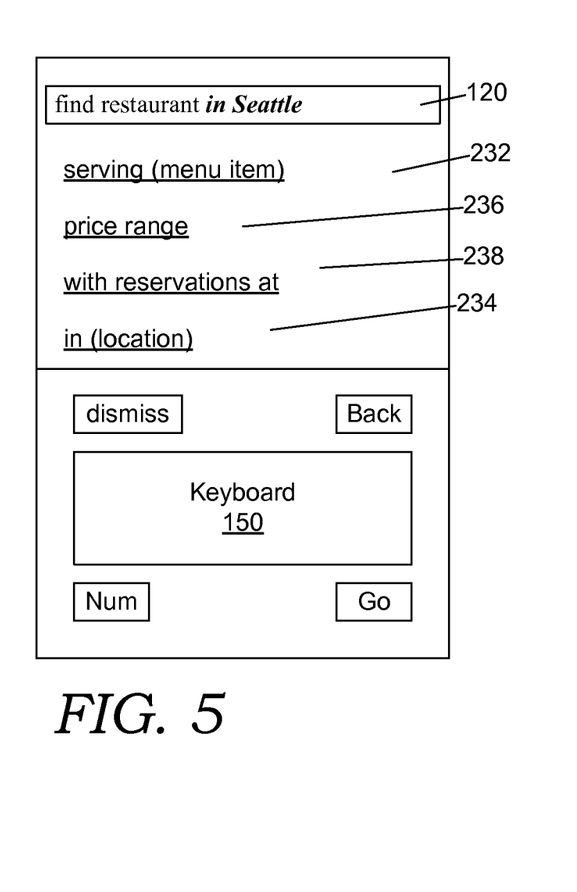

FIG. 5 shows an example of selecting an element already present in the constructed query for modification. In FIG. 5, the user has selected the facet "in" for modification. The facet can be selected by any convenient method. In this instance, the facet was selected by the user using a touch gesture to select the keyword "in". Because "in" is a facet, the corresponding facet value "Seattle" was automatically selected as well. This is in contrast to selecting just the facet value "Seattle". The selection of the facet "in" and facet value "Seattle" is represented by the bold italic text. Of course, any other convenient method for indicating selection could be used, such as a color, a font style, or a font size.

For the example shown in FIG. 5, it is noted that the facet 234 for "in (location)" is displayed as a potential option for selection by the user, even though the text being modified by the user corresponds to this facet. This is one alternative for handling the display of a list of facets or facet values during modification. In this alternative, the facet (or facet value) is still displayed, but the relative ordering of the facets is modified to give the facet a lower position. Another alternative would have been to not show facet 234 at all, or to show facet 234 in the same order within the list of facets.

Figure 6:
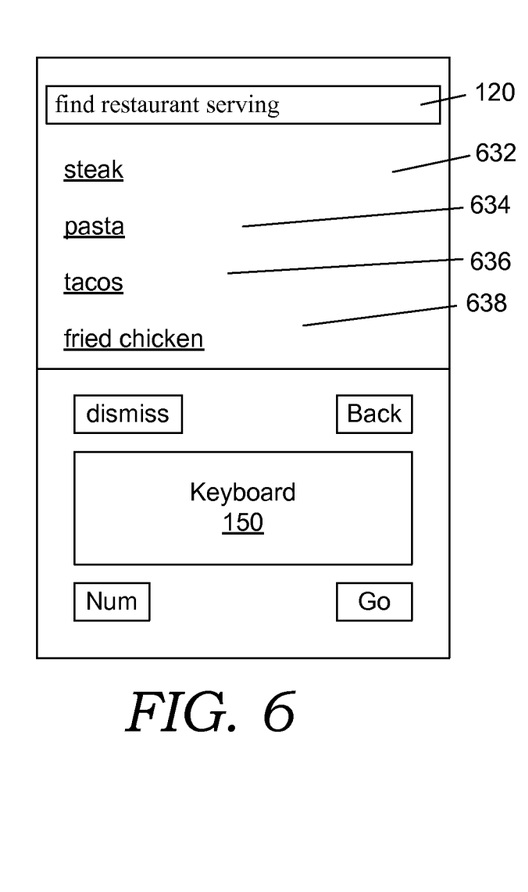

In this example, the user selects facet 232 corresponding to "serving (menu item)" to replace the facet selected in query box 120. The resulting constructed query is now "find restaurant serving". Facet values 632, 634, 636, and 638 for the facet serving are displayed for possible selection by the user for addition to the query.

Figure 7:
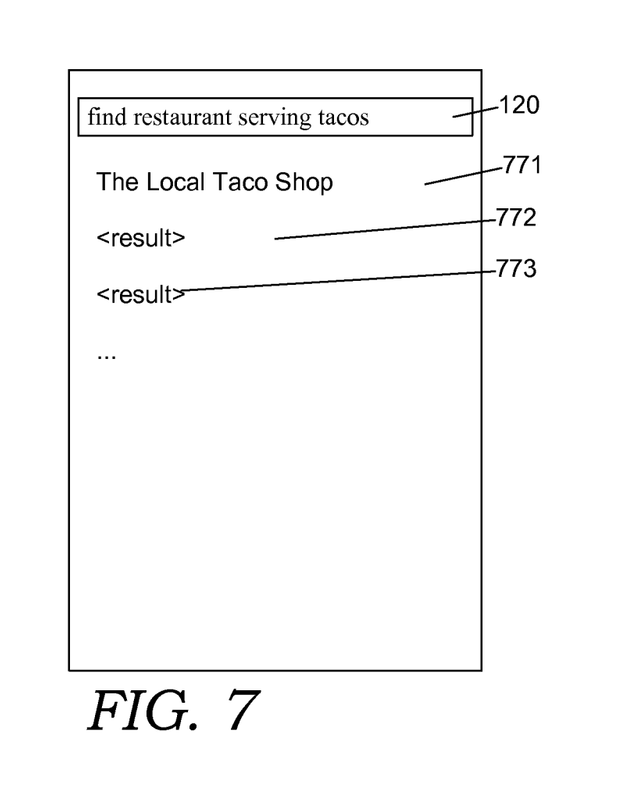

At this point, the user selects the facet value 636 corresponding to "tacos", and then the user pushes the Go key (or virtual key) to submit the search query. The constructed search query of "find restaurants serving tacos" is then processed by a search engine in a conventional manner, and results in a user interface such as the one shown in FIG. 7. In FIG. 7, a series of links 771, 772, and 773 to documents for various restaurants are provided as being responsive to the query, such as the first link 771 for "The Local Taco Shop". It is noted that three results are shown in FIG. 7 for convenience, and that as many results as desired can be returned. Optionally, user input actions can be used to scroll the screen horizontally and/or vertically to reveal more potential results.

Figure 8:
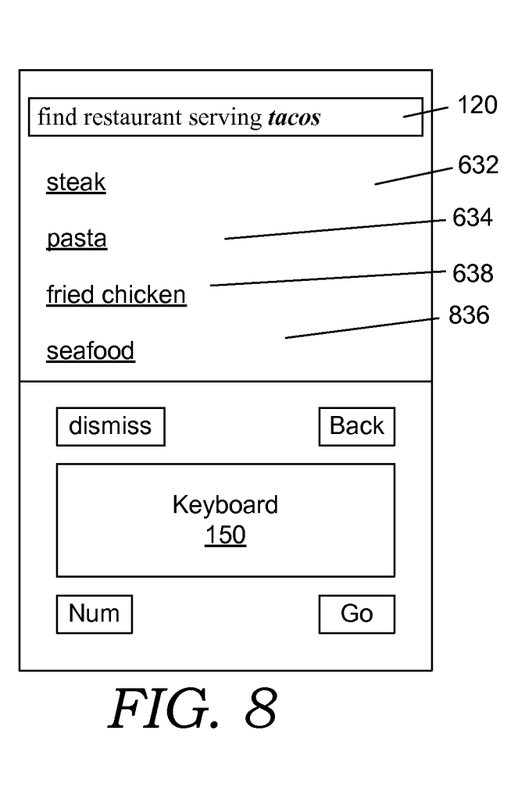

After viewing the available links, the user decides to perform a different search. By selecting a location within the query bar 120, the user brings back the scoped search query builder interface, as shown in FIG. 8. The user then selects the facet value "tacos," as indicated by the bold italic text. Of course, any other convenient designation could be used in an actual interface such as a different color, font size, or font style. Selecting the facet value does not result in the automatic selection of the facet. The user is then provided again with facet value options. In this example, the behavior for selecting an existing facet value is different from the behavior for an existing facet. Since "tacos" are already present in the query, the facet value tacos is not provided to the user as an option. Instead, the user is presented with facet values 632, 634, 638, and 836.

Figure 9:
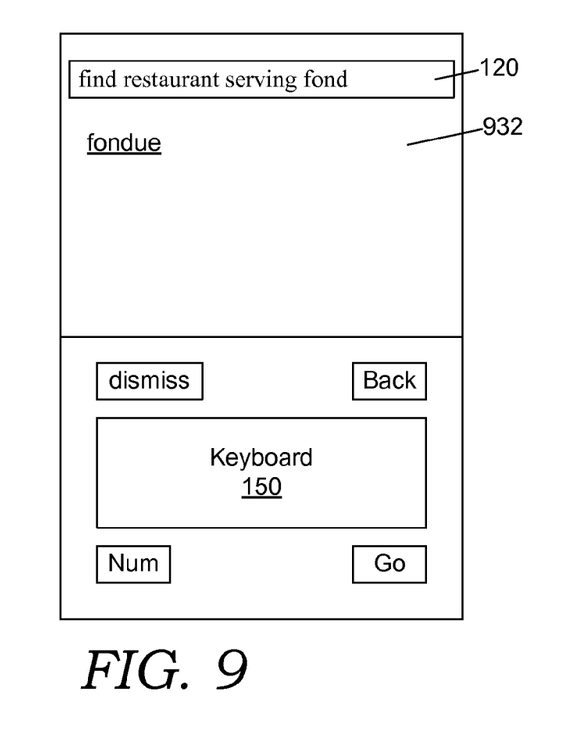

The facet values presented to the user do not correspond to what the user would like to add to the search. Optionally, the user could scroll through additional options by using input gestures or keystrokes. However, in this example, the user decides it is more convenient to type in a facet value. The user types in the letters "fond". As these letters are entered, the text is compared with facet values for possible matches. By the time all four of these letters are entered by the user, the only match identified is the facet value 932 corresponding to "fondue", as shown in FIG. 9.

Figure 10:
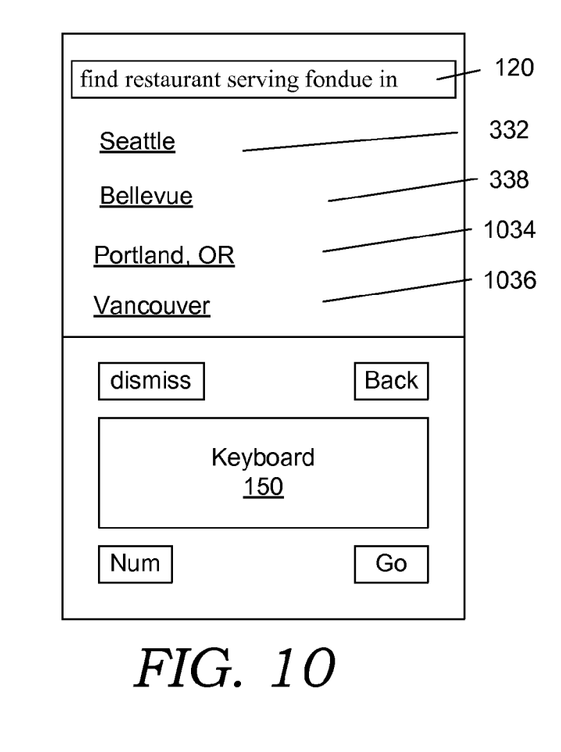

The user selects the facet value 932 for "fondue", and then adds the facet for "in (location)" to the query, in order to narrow the search to restaurants within a locality. The user is then presented with facet values 332, 338, 1034, and 1036. It is noted that only facet values 332 (Seattle) and 338 (Bellevue) are in common with FIG. 3. Facet value 334 (Redmond) is not displayed. This is because a search based on the search query "find restaurant serving fondue in Redmond" would return no results in this hypothetical example. Since a search query that produces no results is not helpful, the user is not presented with the option. Facet value 336 (Tacoma) is not displayed for similar reasons. Instead, facet values 1034 (Portland, Oreg.) and 1036 (Vancouver) are displayed, as adding these terms to the search query would yield at least one matching document.

Figure 11:
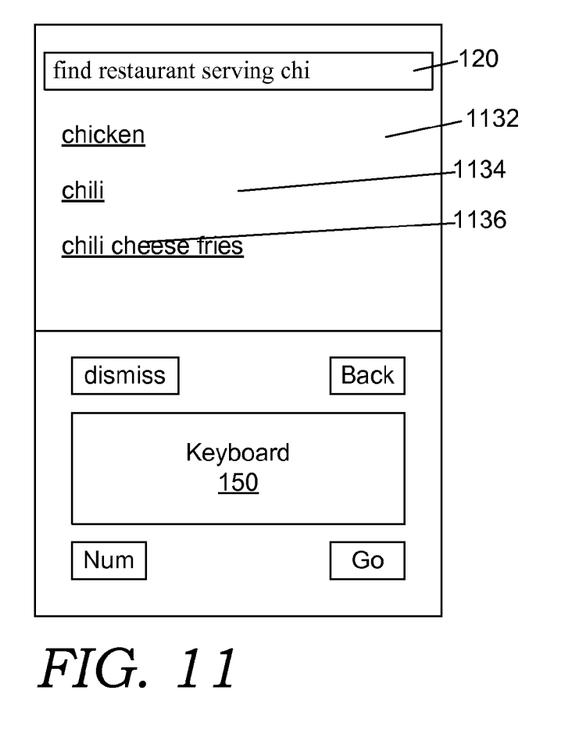
Figure 12:
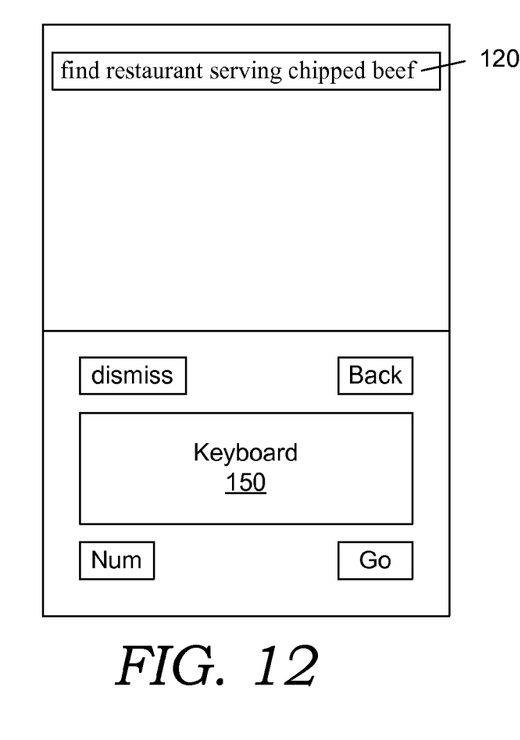

At a later time, the user uses the scoped search query builder again to construct the query "find restaurant serving" shown in FIG. 11. The user then further types the text "chi" in the query box 120 as the beginning of a facet value for the facet "serving". As in FIG. 9, the search engine has provided suggestions 1132, 1134, and 1136 for the facet value that may be intended by "chi". However, the user is interested in "chipped beef", which is not part of the pre-defined facet values in this example. Thus, the user enters the rest of this facet value manually, as shown in FIG. 12. The user can then submit this query using the Go key. Even though the scoped search did not recognize the facet value "chipped beef", the user was able enter the facets and facet values recognized by the query builder, and then complete the query manually by entering text. Optionally, after manually adding the facet value "chipped beef", the user can further expand the query with more typed characters or by adding more facet values from the query builder.

ADDITIONAL EXAMPLES AND EMBODIMENTS

Having briefly described an overview of various embodiments of the invention, an exemplary operating environment suitable for performing the invention is now described. Referring to the drawings in general, and initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

Embodiments of the invention may be described in the general context of computer code, software, or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. This includes mobile devices, such as devices with the capability of making phone calls, tablet style computing devices, and other devices having a small form factor while still providing access to a network via a wireless connection. The invention may also be practiced in distributed computing environments where tasks are performed by remote-processing devices that are linked through a communications network.

Figure 13:
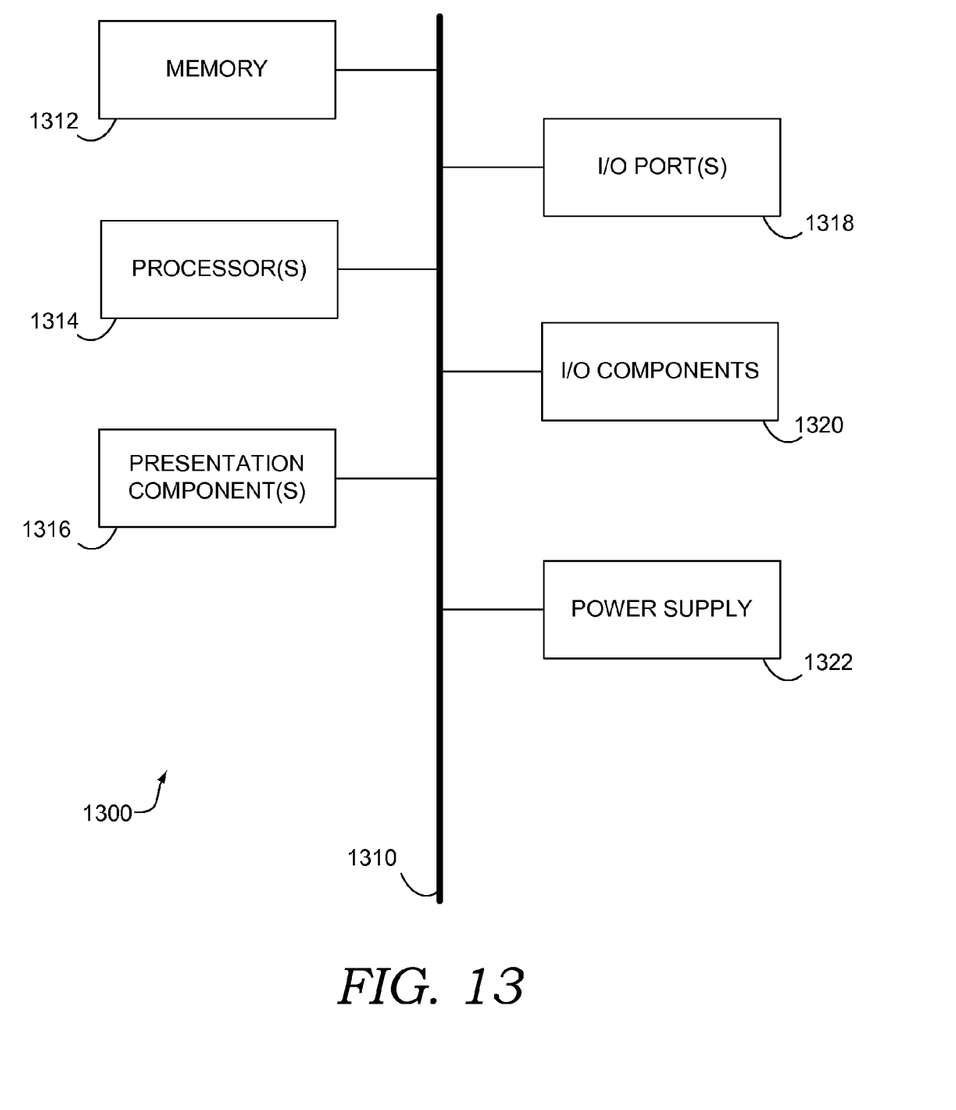
FIG. 13 shows an example of computing device suitable for use in an embodiment of the invention.

With continued reference to FIG. 13, computing device 1300 includes a bus 1310 that directly or indirectly couples the following devices: memory 1312, one or more processors 1314, one or more presentation components 1316, input/output (I/O) ports 1318, I/O components 1320, and an illustrative power supply 1322. Note that some of these components do not have to be present in a computing device. For example, a device may not include external input/output ports 1318, and may instead rely solely on input/output components that are located within external case of the computing device 1300. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

The computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 1300. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 1312 can include computer-storage media in the form of volatile and/or nonvolatile memory. The memory may be removable, non-removable, or a combination thereof. Exemplary hardware devices include solid-state memory, hard drives, optical-disc drives, etc. The computing device 1300 includes one or more processors that read data from various entities such as the memory 1312 or the I/O components 1320. The presentation component(s) 1316 present data indications to a user or other device. Exemplary presentation components include a display device, speaker, printing component, vibrating component, and the like.

The I/O ports 1318 can allow the computing device 1300 to be logically coupled to other devices including the I/O components 1320, some of which may be built in. Illustrative components can include a microphone, joystick, game pad, satellite dish, scanner, printer, wireless device, etc.

Figure 14:
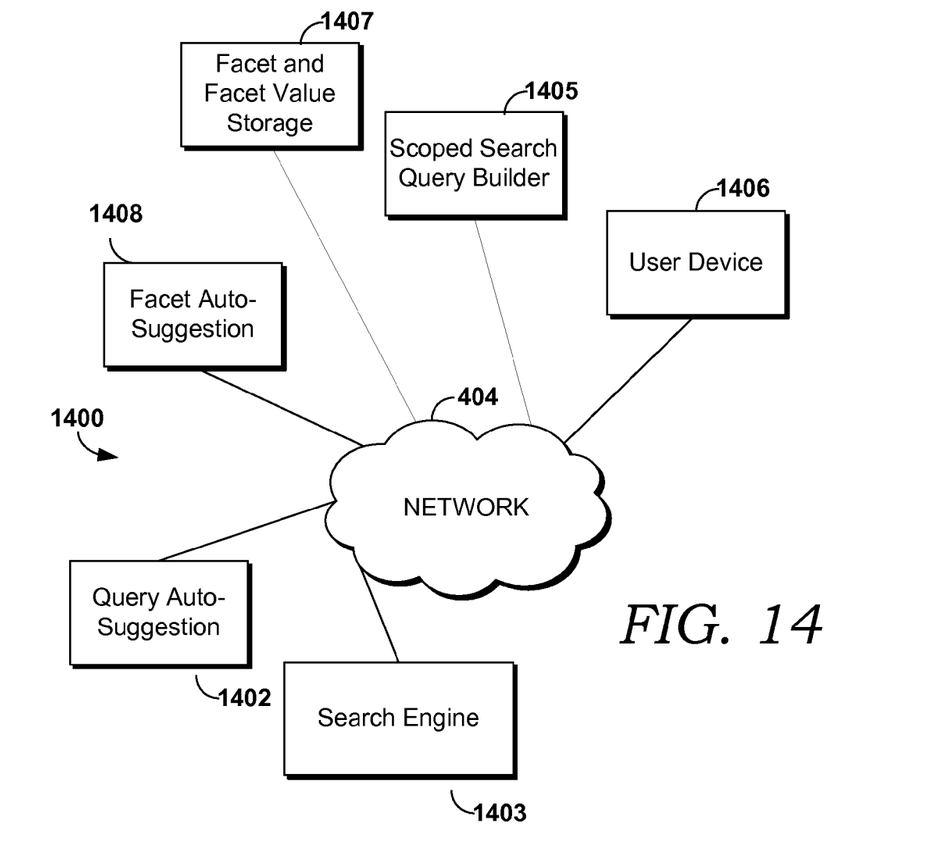
FIG. 14 shows an example of a network environment suitable for use in an embodiment of the invention.

With additional reference to FIG. 14, a block diagram depicting an exemplary network environment 1400 suitable for use in embodiments of the invention is described. The environment 1400 is but one example of an environment that can be used in embodiments of the invention and may include any number of components in a wide variety of configurations. The description of the environment 1400 provided herein is for illustrative purposes and is not intended to limit configurations of environments in which embodiments of the invention can be implemented.

The environment 1400 includes a network 1404, a user device 1406, a scoped search query builder 1405 and a search engine 1403. The environment also includes facet and facet value storage 1407, a facet auto-suggestion component 1408, and a query auto-suggestion component 1402. The network 1404 includes any computer network such as, for example and not limitation, the Internet, an intranet, private and public local networks, and wireless data or telephone networks. The user device 1406 can be any computing device, such as the computing device 1300, from which a search query can be provided. For example, the user device 1406 might be a personal computer, a laptop, a server computer, a wireless phone or device, a personal digital assistant (PDA), or a digital camera, among others. In an embodiment, a plurality of user devices 1406, such as thousands or millions of user devices 1406, can be connected to the network 1404. The search engine 1403 includes any computing device, such as the computing device 1300, and provides functionalities for a content-based search engine.

When a query is being entered on a user device 1406, the query auto-suggestion component 1402 can provide suggestions for related queries and/or provide potential completed versions of queries that a user may be typing. Facet auto-suggestion component 1408 can use the text being entered by a user and determine whether the text is a potential match for any categories, facets, or facet values in face and facet value storage 1407. The user can then be provided with an entry point for using the scoped search query builder 1405 based on a detected match. Alternatively, a user can directly access the scoped search query builder 1405 without typing an initial query portion.

After beginning use of the scoped search query builder 1405, facet auto-suggestion 1408 can continue to provide suggested facets when a user types text into a query bar instead of selecting an option provided by the query builder 1405. When a user is satisfied with a query, the user can submit the query to search engine 1403 for processing.

Figure 15:
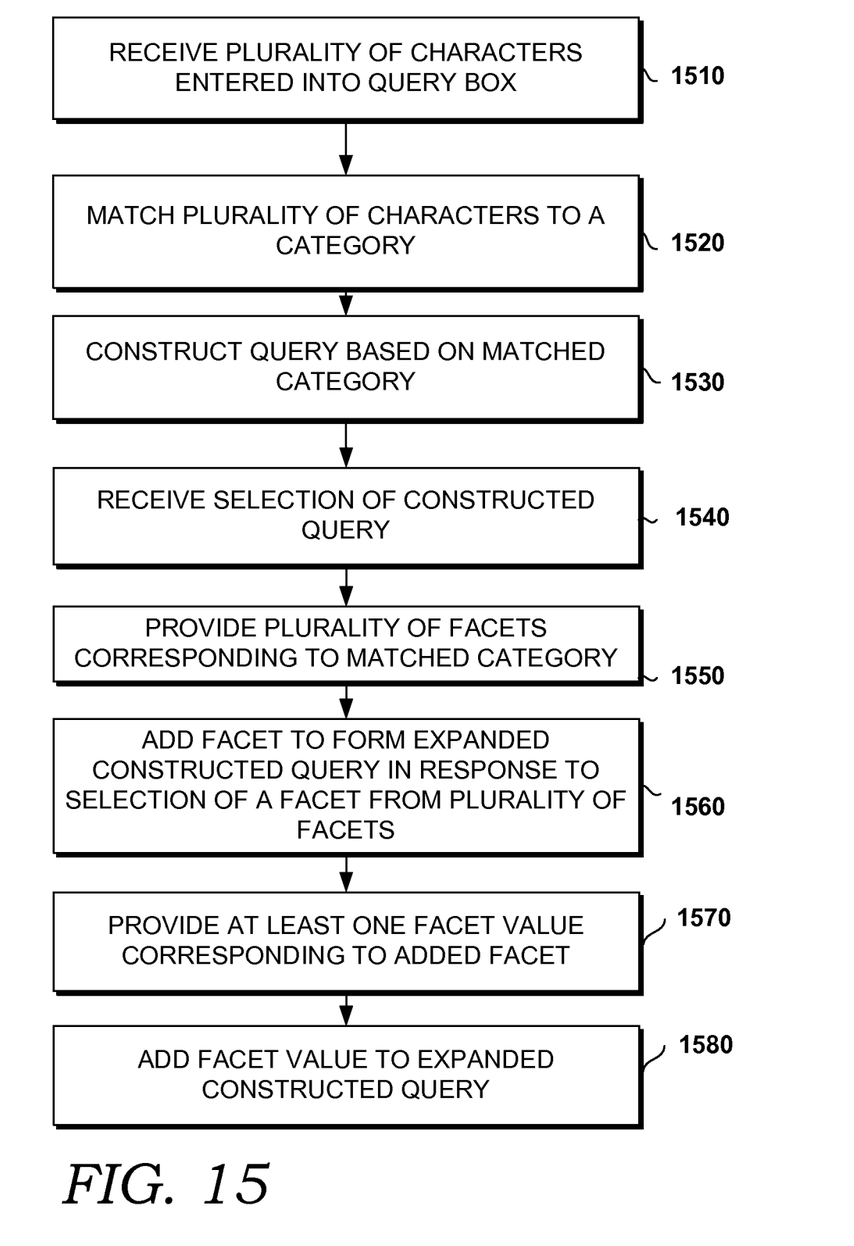
FIGS. 15-17 show examples of methods or processing flows according to some embodiments of the invention.

In another embodiment, a method is provided for constructing a search query. The method includes receiving 1510 a plurality of characters corresponding to characters entered into a query box. The characters can be entered into the query box in any convenient manner, such as by typing on a physical or virtual keyboard, or by using voice recognition to capture verbal instructions from a user. The plurality of characters are matched 1520 to a category. Optionally, this matching can represent matching the plurality of characters to a facet or facet value within a category, as opposed to directly matching the category itself. A query is then constructed 1530 based on the matching of the plurality of characters, the constructed query including the matched category. Optionally, if the query was matched based on a facet or facet value within the category, the matched facet or facet value can also be included in the constructed query. A selection of the constructed query is then received 1540. This selection can be based on the constructed query being presented to the user as an entry point or link to a scoped search query builder interface. After receiving the selection of the constructed query, a plurality of facets are provided 1550 corresponding to the matched category. A facet is then added 1560 to the constructed query to form an expanded constructed query, the facet being added in response to receiving a selection of the facet from the provided plurality of facets. At least one facet value is then provided 1570 corresponding to the added facet. A facet value is then added 1580 to the expanded constructed query in response to receiving a selection of the facet value from the provided at least one facet value.

Figure 16:
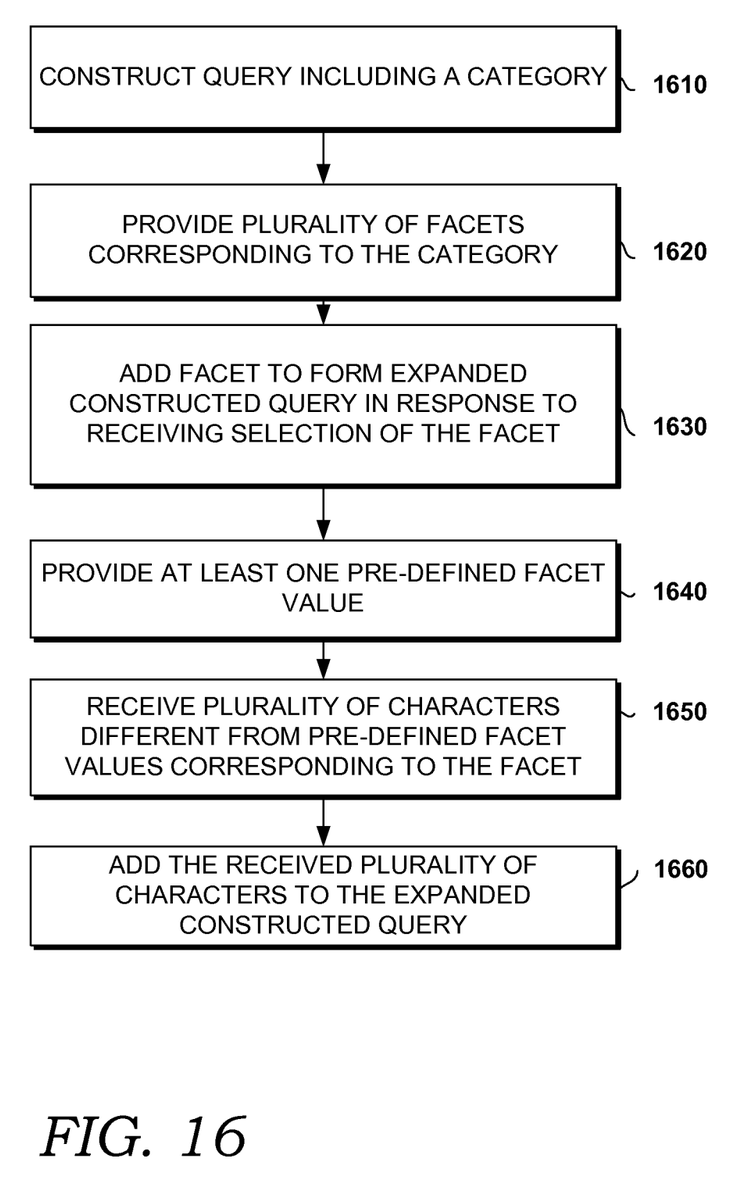
Figure 17:
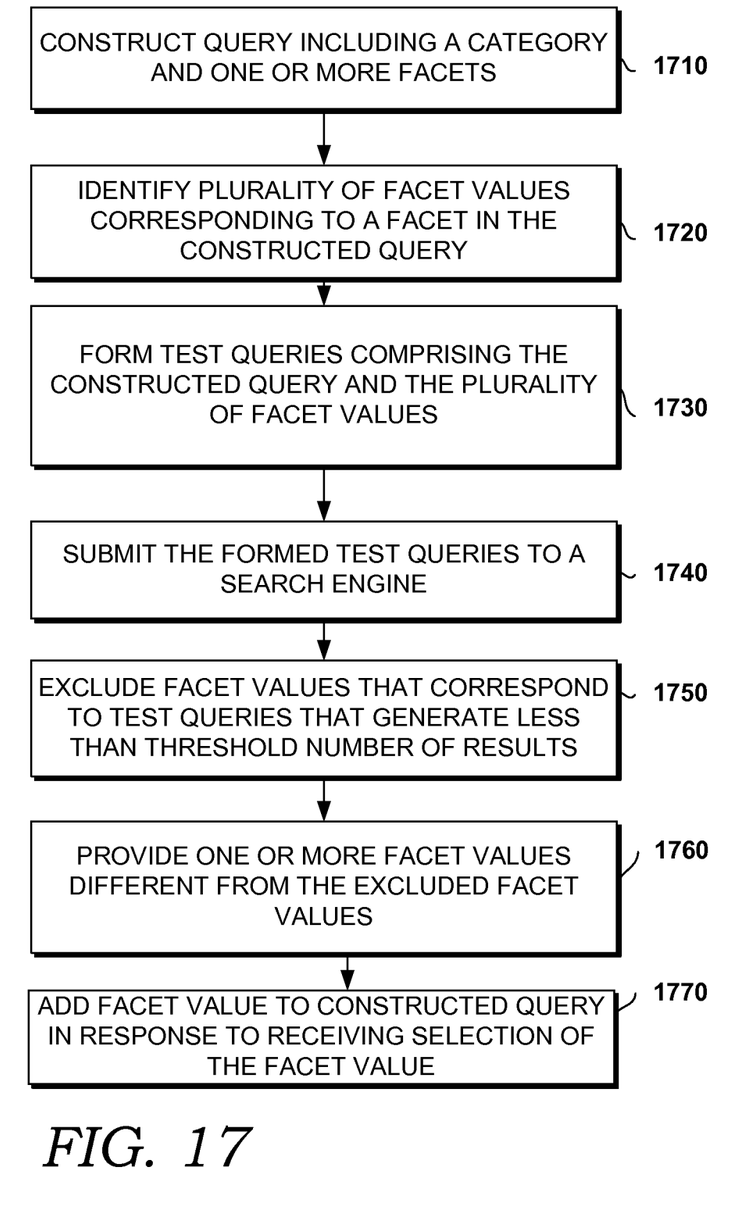

In still another embodiment, a method is provided for constructing a search query. The method includes constructing 1610 a query including a category. A plurality of facets are provided 1620 corresponding to the category. A facet is then added 1630 to the constructed query to form an expanded constructed query. The facet is added in response to receiving a selection of the facet from the provided plurality of facets. At least one pre-defined facet value is provided 1640 that corresponds to the added facet. A plurality of characters different from pre-defined facet values corresponding to the facet are received 1650. The received plurality of characters are added 1660 to the expanded constructed query In yet another embodiment, a method is provided for constructing a search query. The method includes constructing 1710 a query including a category and one or more facets. A plurality of facet values are identified 1720 corresponding to a facet in the constructed query. Test queries are formed 1730 comprising the constructed query and facet values from the plurality of identified facet values. The formed test queries are submitted 1740 to a search engine. Facet values that correspond to test queries that generate less than a threshold number of matching documents when submitted to the search engine are excluded 1750. One or more facet values corresponding to the facet are provided 1760, the provided one or more facet values being different from the excluded facet values. A facet value is then added 1770 to the expanded query in response to receiving a selection of the facet value from the provided one or more facet values Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for constructing a search query, comprising:
    receiving a plurality of characters corresponding to characters entered into a query box;
    matching the plurality of characters to a category;
    constructing a query based on the matching of the plurality of characters, the constructed query including the matched category;
    receiving a selection of the constructed query;
    providing a plurality of facets corresponding to the matched category;
    adding a facet to the constructed query to form an expanded constructed query, the facet being added in response to receiving a selection of the facet from the provided plurality of facets;
    providing, in response to receiving the selection of the facet from the provided plurality of facets, at least one facet value corresponding to the added facet; and
    adding a facet value to the expanded constructed query in response to receiving a selection of the facet value from the provided at least one facet value,
    wherein the selection of the facet is received prior to receiving a selection of a facet value corresponding to the facet.

2. The method of claim 1, wherein matching the plurality of characters to a category comprises matching the plurality of characters to a facet or facet value associated with the category.

3. The method of claim 2, wherein matching the plurality of characters to a category comprises matching the plurality of characters to a pre-defined category, facet, or facet value.

4. The method of claim 2, wherein constructing a query further comprises including a matched facet or matched facet value in the query.

5. The method of claim 1, wherein providing at least one facet value corresponding to the added facet comprises:
    identifying a plurality of facet values corresponding to the added facet;
    forming test queries comprising the expanded query and a facet value from the plurality of facet values;
    submitting the formed test queries to a search engine;
    excluding facet values that correspond to test queries that generate less than a threshold number of matching documents when submitted to the search engine; and
    providing at least one facet value different from the excluded facet values.

6. The method of claim 5, wherein the threshold number of matching documents is one.

7. The method of claim 1, further comprising:
    receiving a selection of the facet value added to the expanded constructed query;
    providing one or more facet values corresponding to the added facet;
    receiving a selection of a second facet value from the one or more facet values; and
    replacing the facet value added to the expanded constructed query with a second facet value.

8. The method of claim 7, wherein the second facet value corresponds to a character string that does not match a pre-defined facet value.

9. The method of claim 7, further comprising:
    providing one or more facet values corresponding to the added facet in response to receiving the selection of the facet value added to the expanded constructed query; and
    replacing the facet value added to the expanded constructed query with a facet value selected from the provided one or more facet values.

10. The method of claim 9, wherein the provided one or more facet values are different than the facet value added to the expanded constructed query.

11. The method of claim 1, further comprising:
    receiving a selection of the facet added to the constructed query, the selection being received after addition of the facet value to the expanded constructed query;
    providing one or more facets corresponding to the matched category;
    receiving a selection of a second facet from the one or more facets;
    removing the added facet value from the expanded constructed query; and
    replacing the facet added to the constructed query with the second facet.

12. The method of claim 11, further comprising automatically selecting the added facet value after receiving the selection of the facet added to the constructed query.

13. A computer-implemented method for constructing a search query, comprising:

constructing a query including a category and one or more facets;

selecting a plurality of facet values corresponding to a facet in the constructed query, the plurality of facet values being selected from a pre-defined list;

forming test queries comprising the constructed query and the selected plurality of facet values;

submitting the formed test queries to a search engine;

excluding facet values that correspond to test queries that generate less than a threshold number of matching documents when submitted to the search engine;

providing one or more facet values corresponding to the facet, the provided one or more facet values being different from the excluded facet values; and adding a facet value to the constructed query in response to receiving a selection of the facet value from the provided one or more facet values.

14. The computer-implemented method of claim 13, wherein the threshold number of matching documents is one.

15. The computer-implemented method of claim 13, wherein selecting a plurality of facet values comprises:

receiving a selection of a facet in the constructed query; and identifying a plurality of facet values corresponding to the selected facet.

16. A method for constructing a search query, comprising:

constructing a query including a category;

displaying a plurality of facets corresponding to the category;

adding a facet to the constructed query to form an expanded constructed query, the facet being added in response to receiving a selection of the facet from the displayed plurality of facets, the selection of the facet being received prior to receiving a selection of a facet value corresponding to the facet;

providing at least one pre-defined facet value corresponding to the added facet;

receiving a plurality of characters different from pre-defined facet values corresponding to the added facet, the received plurality of characters comprising a facet value corresponding to the added facet; and adding the received plurality of characters to the expanded constructed query.

17. The method of claim 16, further comprising:

providing a second plurality of facets corresponding to the category after addition of the received plurality of characters; and adding a second facet to the expanded constructed query, the second facet being added in response to receiving a selection of the second facet from the provided second plurality of facets.

18. The method of claim 17, further comprising:

providing a second plurality of facet values corresponding to the second facet value; and adding a second facet value to the expanded constructed query, the second facet value being added in response to receiving a selection of the second facet value from the provided second plurality of facet values.

19. The method of claim 18, wherein providing a second plurality of facet values comprises:

identifying a plurality of facet values corresponding to the second facet;

forming test queries comprising the expanded constructed query and a facet value from the identified plurality of facet values;

submitting the formed test queries to a search engine;

excluding facet values that correspond to test queries that generate less than a threshold number of matching documents when submitted to the search engine; and providing at least one facet value different from the excluded facet values.

20. The method of claim 16, further comprising submitting to a search engine the expanded constructed query, the expanded constructed query including the added plurality of characters.

* * * * *